(12) United States Patent
Zhou

(10) Patent No.: US 8,915,772 B2
(45) Date of Patent: Dec. 23, 2014

(54) CRAB SHELLING MACHINE

(71) Applicant: Suzhou Xi Fu Rui Agriculture Technologies Co., Ltd, Suzhou, Jiangsu Province (CN)

(72) Inventor: Pengfei Zhou, Suzhou (CN)

(73) Assignee: Suzhou Xi Fu Rui Agriculture Technologies Co., Ltd., Suzhou, Jiangsu Province (CN)

( * ) Notice: Subject to any disclaimer, the term of this patent is extended or adjusted under 35 U.S.C. 154(b) by 0 days.

(21) Appl. No.: 14/195,857

(22) Filed: Mar. 4, 2014

(65) Prior Publication Data

US 2014/0248826 A1 Sep. 4, 2014

(30) Foreign Application Priority Data

Mar. 4, 2013 (CN) .......................... 2013 2 0096066

(51) Int. Cl.
*A22C 29/02* (2006.01)

(52) U.S. Cl.
CPC .................................. *A22C 29/024* (2013.01)
USPC ........................................................... 452/1

(58) Field of Classification Search
CPC .... A22C 29/00; A22C 29/025; A22C 29/021; A22C 29/023; A22C 29/026
USPC ....................................................... 452/1–20
See application file for complete search history.

(56) References Cited

U.S. PATENT DOCUMENTS

| | | | | |
|---|---|---|---|---|
| 4,003,103 A | * | 1/1977 | Wenstrom et al. ................. | 452/7 |
| 4,004,321 A | * | 1/1977 | Harrison ............................ | 452/9 |
| 4,293,981 A | * | 10/1981 | Smith ................................ | 452/1 |
| 4,503,586 A | * | 3/1985 | Lockerby et al. ................. | 452/1 |
| 4,523,349 A | * | 6/1985 | Warren .............................. | 452/9 |
| 4,928,352 A | * | 5/1990 | Thibodeaux ...................... | 452/1 |

* cited by examiner

*Primary Examiner* — Richard Price, Jr.
(74) *Attorney, Agent, or Firm* — Cheng-Ju Chiang

(57) ABSTRACT

A crab shelling machine includes first and second transfer mechanisms for conveying crabs, a cutting mechanism for sectioning the crabs and a separating mechanism for separating crab meat and/or crab roe from crab shells. The cutting mechanism includes a frame body, a pair of transmitting apparatuses positioned above the frame body, and a cutter vertically extending into a slot formed by the pair of transmitting apparatuses. The slot is adapted for the crabs to be conveyed therethrough. Each transmitting apparatus includes two transport wheels and a transport belt associated to the transport wheels. The separating mechanism includes a storage box located above the second transfer mechanism, a suction tube fixed to the storage box for separating the crab meat and/or the crab roe, and a driving apparatus for driving the suction tube.

20 Claims, 5 Drawing Sheets

CRAB SHELLING MACHINE

CROSS REFERENCE TO RELATED APPLICATION

The present application claims the priority of Chinese Patent Application No. 201320096066.6, filed on Mar. 4, 2013 in the SIPO (Sate Intellectual Property Office of the P.R.C.), the disclosure of which is incorporated herein by reference in its entirety.

BACKGROUND

1. Technical Field

The present disclosure relates to a shelling machine, particularly to a crab shelling machine for separating crab meat and/or crab roe from crab shells.

2. Description of Related Art

Crabs are a kind of arthropoda crustacean having delicious taste and rich nutritious. In recent years, with rapid increase in aquaculture production of crabs, there are more and more food-related types processed by the crabs and well received by the consumers.

Most crab-processing products are made from crab meat and crab roe, so we can see that it is a key step to separate the crab meat and the crab roe from the crab shell. In the existing crab processing flows, the crab meat and the crab roe are separated from the crab shell basically via manual work. The main processes include manually using a variety of small tools, such as knives, scissors, tweezers, spoons etc., to scrape the crab meat and the crab roe from the crab shells, after cleaning and cooking the crabs. It is understandable that such processes may result in large labor intensity, low processing efficiency and the waste of more residual meat on the crab shells, and so on. Besides, such processes may cause the manual processing pollution and affect food safety.

Hence, it is desirable to provide an automatic crab shelling machine for separating the crab meat and the crab roe from the crab shells.

SUMMARY

The present embodiment provides a crab shelling machine including a first transfer mechanism, a cutting mechanism for sectioning crabs into at least two parts, a second transfer mechanism, and a separating mechanism for separating crab meat and/or crab roe from crab shells of the at least two parts. The first transfer mechanism includes a first belt for conveying crabs along a conveying direction. The cutting mechanism includes a frame body, a pair of transmitting apparatuses positioned above the frame body, a cutter vertically extending into a slot formed by the pair of transmitting apparatuses, and a control apparatus for controlling working of the cutter and the transmitting apparatuses. The pair of transmitting apparatuses are parallel to each other along the conveying direction. The slot is adapted for the crabs to be conveyed therethrough. Each transmitting apparatus includes two transport wheels oppositely disposed along the conveying direction and a transport belt associated to the transport wheels. The slot is formed between the adjacent transport belts of the pair of transmitting apparatuses. The second transfer mechanism includes a second belt for conveying the at least two parts. The separating mechanism includes a storage box above the second transfer mechanism, a suction tube fixed to the storage box for separating the crab meat and/or the crab roe, and a driving apparatus for driving working of the suction tube.

The foregoing has outlined rather broadly the features and technical advantages of the present disclosure in order that the detailed description of the disclosure that follows may be better understood. Additional features and advantages of the disclosure will be described hereinafter which form the subject of the claims of the invention.

BRIEF DESCRIPTION OF THE DRAWINGS

The components in the drawing are not necessarily drawn to scale, the emphasis instead being placed upon clearly illustrating the principles of the described embodiments. In the drawings, reference numerals designate corresponding parts throughout various views, and all the views are schematic.

DETAILED DESCRIPTION OF THE ILLUSTRATED EMBODIMENT

Figure 1:
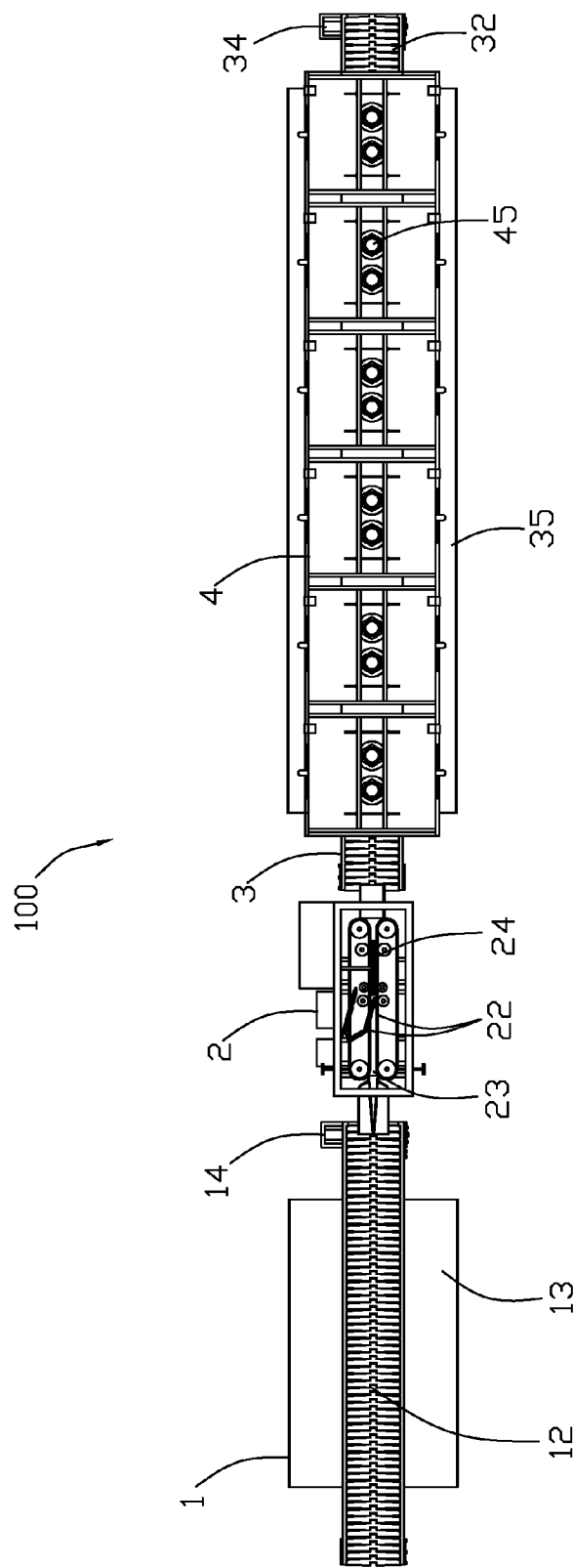
FIG. 1 is a perspective view of a crab shelling machine in accordance with an illustrated embodiment of the present invention.

Reference will now be made to the drawing figures to describe the embodiments of the present invention in detail. In the following description, the same drawing reference numerals are used for the same elements in different drawings.

Referring to FIGS. 1 to 5, an embodiment of the present invention discloses a crab shelling machine 100 for separating crab meat and/or crab roe from crab shells. The crab shelling machine 100 includes a first transfer mechanism 1, a cutting mechanism 2 for sectioning the crabs into at least two parts, a second transfer mechanism 3 for conveying the cut parts and a plurality of separating mechanisms 4 for separating the crab meat and/or the crab roe from the crab shells of the cut parts.

Figure 2:
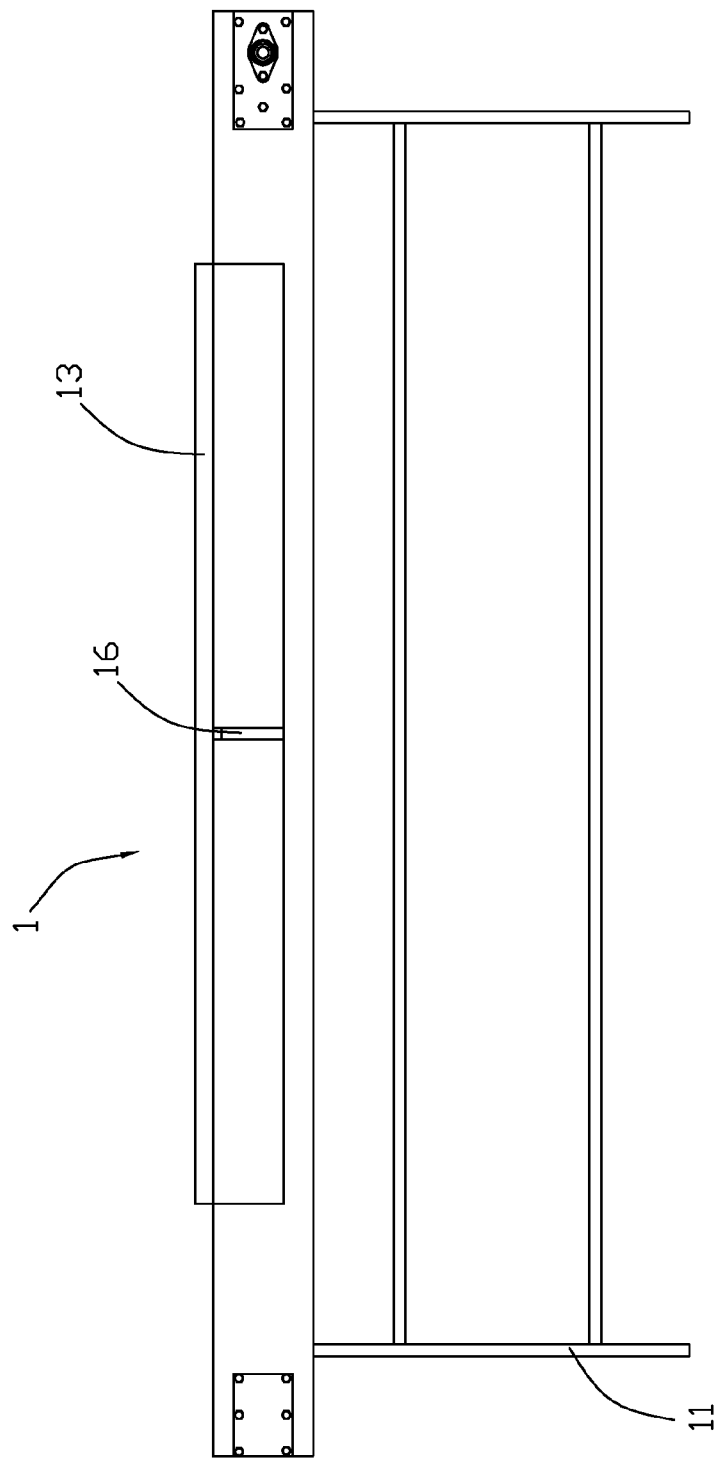
FIG. 2 is a front view of a first transfer mechanism of the crab shelling machine shown in FIG. 1.

Referring to FIGS. 1 and 2, the first transfer mechanism 1 includes a first bracket 11, a first belt 12 supported on top of the first bracket 11, a first working table 13 located on opposite sides of the first belt 12, a first studdle 16 for supporting the first working table 13, and a first motor 14 for driving the first belt 12. The crabs can be automatically conveyed to the cutting mechanism 2 along a conveying direction via the first belt 12 under the drive of the first motor 14. Besides, the first working table 13 can be used for workers (not shown) to select disqualified crabs or rearrange the crabs in a predetermined direction so that the crabs can orderly enter into the cutting mechanism 2.

Figure 3:
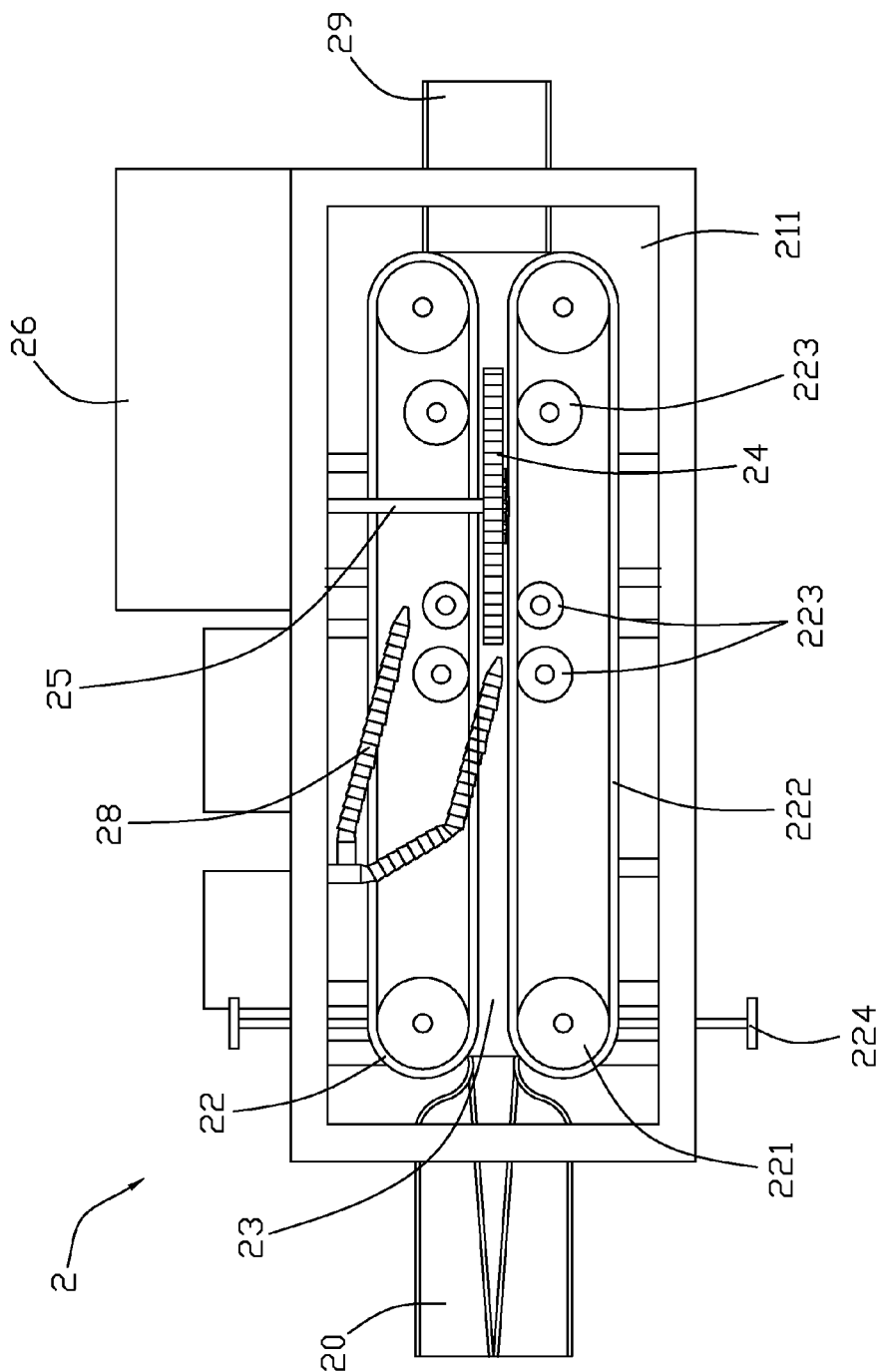
FIG. 3 is a top view of a cutting mechanism of the crab shelling machine shown in FIG. 1.
Figure 4:
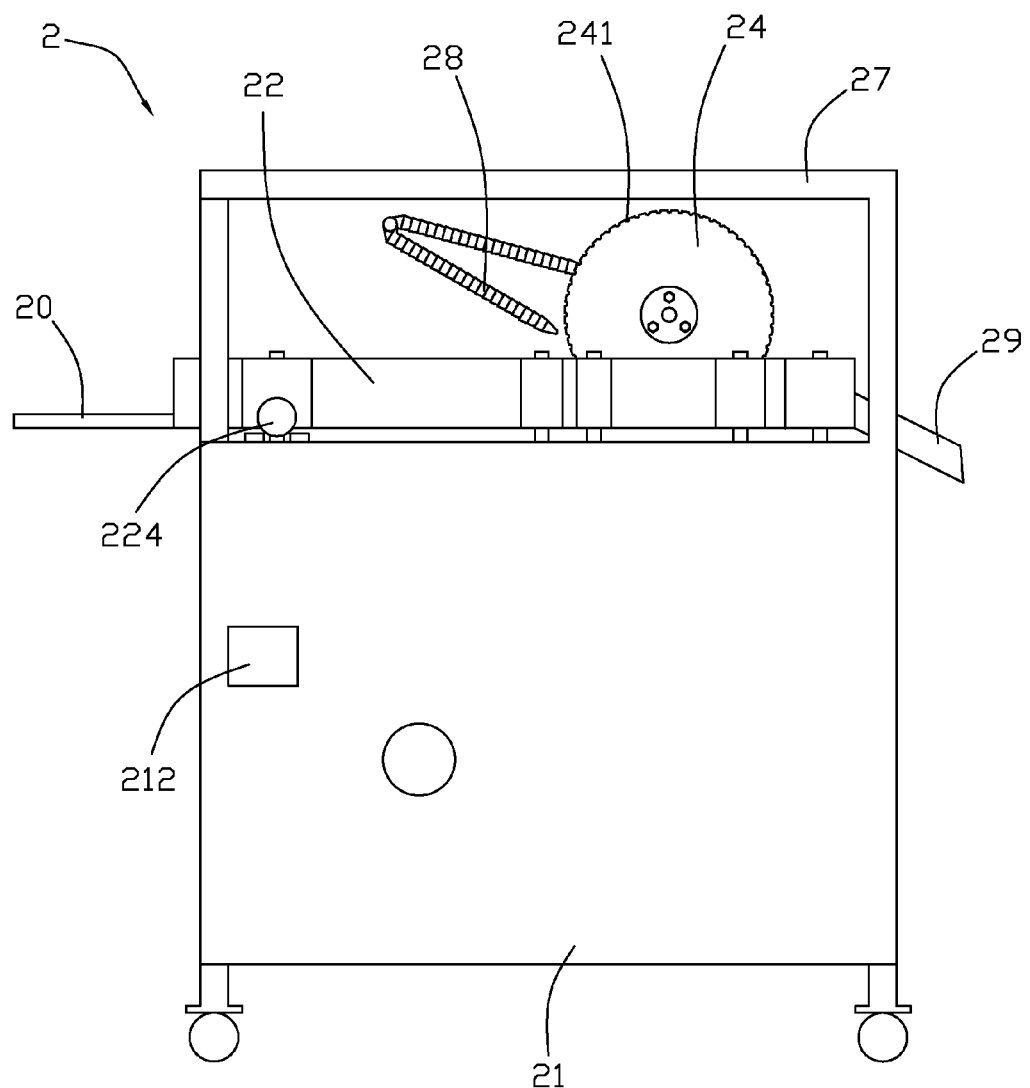
FIG. 4 is a front view of the cutting mechanism shown in FIG. 3.

Referring to FIGS. 1, 3 and 4, the cutting mechanism 2 includes a frame body 21, a pair of transmitting apparatuses 22 positioned above the frame body 21, a cutter 24 vertically extending into a slot 23 formed by the pair of transmitting apparatuses 22, an input axis 25 securely connected to the cutter 24, and a control apparatus 26 for controlling working of the cutter 24 and the transmitting apparatuses 22. The pair of transmitting apparatuses 22 are parallel to each other along the conveying direction. The slot 23 is adapted for the crabs to be conveyed therethrough. The cutting mechanism 2 further includes a horizontal protrusion 20 connected to the first belt 12 to function as a feed port, a downwardly inclined protrusion 29 connected to the second transfer mechanism 3 to function as a discharge port, a box 27 shielding the transmitting apparatuses 22, the slot 23 and the cutter 24, and a delivery tube 28 fixed to the box 27 for spraying cleaning fluid to clean the cutter 24. Either the feed port or the discharge port is wider than the slot 23 so that on one hand, the relative wide feed port and the discharge port are easier for conveying the crabs before cutting and after cutting, and on the other hand, the relative narrow slot 23 is easier for restricting the crabs so as to be accurately sectioned by the cutter 24.

The frame body 21 includes a water-storage box 211 under the transmitting apparatuses 22 and a drain hole 212 formed on the water-storage box 211. Each transmitting apparatus 22 includes two transport wheels 221 oppositely disposed along the conveying direction, a transport belt 222 associated to the transport wheels 221, and a plurality of idler wheels 223 located between the two transport wheels 221. The idler wheels 223 are smaller than the transport wheels 221 and the idler wheels 223 of each transmitting apparatus 22 are of different diameters. The transport belt 222 is elastic. The idler wheels 223 are located inside and engage with the transport belt 222 in order to tension the transport belt 222. The slot 23 is formed between the adjacent transport belts 222 of the pair of transmitting apparatuses 22. The cutting mechanism 2 further includes a rod 224 connected to at least one of the transport wheels 221 in order to adjust a width of slot 23. According to the illustrated embodiment of the present invention, the cutter 24 is round and rotates in a vertical plane. The cutter 24 includes a plurality of knife cutouts 241 which are averagely distributed on a circumference of the cutter 24. Each knife cutout 241 is of a semi-elliptical shape so that the crabs cannot fly out of the cutting mechanism 2 because of the gravitation generated by each semi-elliptical knife cutout 241, thereby the cutting process can be effectively operated. The input axis 25 is perpendicularly connected to a center of the cutter 24 and is driven by the control apparatus 26 so as to rotate the cutter 24.

Figure 5:
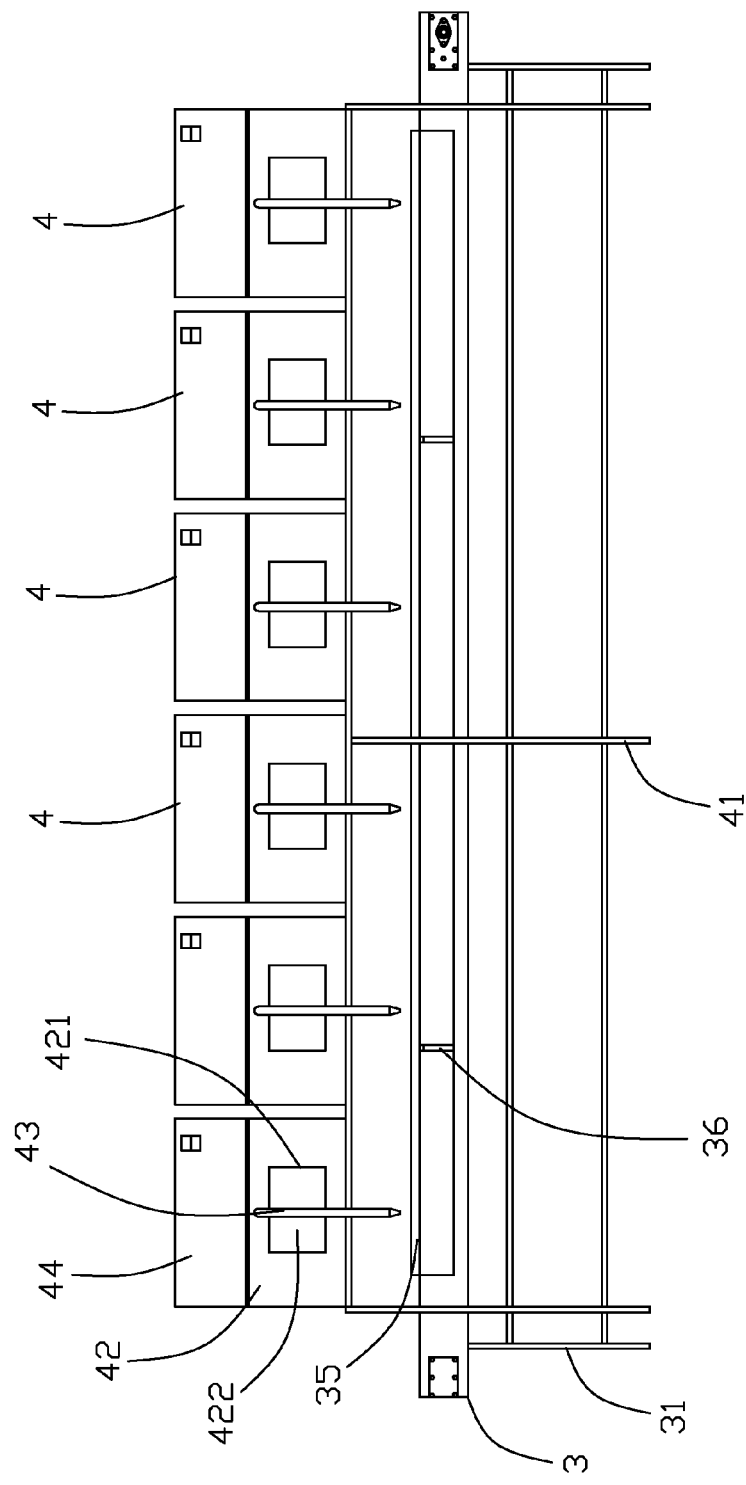
FIG. 5 is a front view of a second transfer mechanism and a separating mechanism of the crab shelling machine shown in FIG. 1.

Referring to FIGS. 1 and 5, the second transfer mechanism 3 includes a second bracket 31, a second belt 32 supported on top of the second bracket 31 and a second motor 34 for driving the second belt 32.

The separating mechanism 4 includes a third bracket 41 arranged outside of the second bracket 31, a plurality of storage boxes 42 located above the second transfer mechanism 3, a plurality of suction tubes 43 fixed to each storage box 42 for separating the crab meat and/or the crab roe, a driving apparatus 44 for driving working of the suction tubes 43, and a plurality of temperature alarm apparatuses 45 set on the storage boxes 42. Each suction tube 43 extends along a vertical direction perpendicular to the conveying direction. Each storage box 42 includes a discharge opening 421 and a transparent glass door 422 for opening or closing the discharge opening 421. The third bracket 41 is higher than the second bracket 31. The storage boxes 42 are positioned above the second belt 32 of the second transfer mechanism 3 so that the cut parts of the crabs can be automatically conveyed to a position under the separating mechanism 4 via the second belt 32 under the drive of the second motor 34. Besides, the second transfer mechanism 3 includes a second working table 35 at opposite sides of the second belt 32 for placing the cut parts and a second studdle 36 for supporting the second working table 35. The second working table 35 can be adapted for placing the cut parts of the crabs which have been conveyed to the position under the storage boxes 42. As a result, the cut parts of the crabs can be taken up by the workers to be in alignment with the suction tubes 43 for separating the crab meat and/or the crab roe from the crab shells. The crab meat and/or the crab roe separated from the crab shells are collected into the storage boxes 42 through the suction tubes 43. Once the temperature in the storage boxes 42 is too high after multiple operations, the temperature alarm apparatus 45 will ring in order to ensure the safety of the workers.

Referring to FIGS. 1 to 5, according to the illustrated embodiment of the present invention, when the crab shelling machine 100 starts to work, firstly, the crabs are conveyed to move towards the cutting mechanism 2 via the first belt 12 under the drive of the first motor 14. When the crabs move adjacent to the cutting mechanism 2, the crabs are rearranged in a predetermined direction so that the crabs can orderly enter into the feed port of the cutting mechanism 2. Then, under the control of the control apparatus 26, the pair of transmitting apparatuses 22 begin to run. Under this condition, the crabs are clamped or restricted by the adjacent transport belts 222 of the pair of transmitting apparatuses 22 in the slot 23. Then, the crabs are subsequently conveyed to move towards the cutter 24 along the conveying direction and each crab is ultimately cut into two parts. After the crabs have been cut, the two parts are continued to be conveyed by the transport belts 222 along lateral sides of the cutter 24. The cut parts finally move through the discharge port to drop down onto the second belt 32. Secondly, the cut parts are conveyed by the second belt 32 under the drive of the second motor 34 to the position under the separating mechanism 4. Then, the cut parts of the crabs under the separating mechanism 4 are taken up by the workers to be in alignment with the suction tubes 43 for suctioning out the crab meat and/or the crab roe from the crab shells. The crab meat and/or the crab roe separated from the crab shells are collected into the storage boxes 42 through the suction tubes 43. Finally, when the workers find that the crab meat and/or the crab roe in the storage boxes 42 are going to full as observed through the transparent glass door 422, the crab meat and/or the crab roe will be taken out from the storage boxes 42 through the discharge openings 421.

In addition, the number of the separating mechanism 4 can be one or more according to the present invention. When there is only one separating mechanism 4, the crab meat and the crab roe can be separated from the crab shells either separately or simultaneously. When there are multiple separating mechanisms 4, on one hand, the crab meat and the crab roe can be suctioned out from the crab shells separately and can be placed separately; on the other hand, the multiple separating mechanisms 4 can work together to improve processing efficiency. Furthermore, under this condition, even one of the separating mechanisms 4 is broken, the remaining separating mechanisms 4 can also work. Besides, each separating mechanism 4 can be provided with multiple suction tubes 43 for improving suction efficiency.

According to the description above, through the first transfer mechanism 1 conveying the crabs to the cutting mechanism 2, the cutting mechanism 2 cutting the crabs into a plurality of parts, the second belt 32 conveying the cut parts and the separating mechanism 4 separating out the crab meat and/or the crab roe, the crab shelling machine 100 according to the illustrated embodiment of the present invention can realize automatically processing, thereby improve the processing efficiency of the processing products.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

What is claimed is:

1. A crab shelling machine comprising:
a first transfer mechanism comprising a first belt for conveying crabs along a conveying direction;
a cutting mechanism for sectioning the crabs into at least two parts, the cutting mechanism comprising a frame body, a pair of transmitting apparatuses positioned above the frame body, a cutter vertically extending into a slot formed by the pair of transmitting apparatuses, and a control apparatus for controlling working of the cutter and the transmitting apparatuses, the pair of transmitting apparatuses being parallel to each other along the conveying direction so as to form the slot which is adapted for the crabs to be conveyed therethrough, each transmitting apparatus comprising two transport wheels oppositely disposed along the conveying direction and a transport belt associated to the transport wheels, the slot being formed between the adjacent transport belts of the pair of transmitting apparatuses;
a second transfer mechanism comprising a second belt for conveying the at least two parts; and
a separating mechanism for separating crab meat and/or crab roe from crab shells of the at least two parts, the separating mechanism comprising a storage box located above the second transfer mechanism, a suction tube fixed to the storage box for suctioning out the crab meat and/or the crab roe, and a driving apparatus for driving working of the suction tube.

2. The crab shelling machine as claimed in claim 1, wherein the cutter is round and rotates in a vertical plane, and the cutter comprises a plurality of knife cutouts which are averagely distributed on a circumference of the cutter.

3. The crab shelling machine as claimed in claim 2, wherein each knife cutout is of a semi-elliptical shape.

4. The crab shelling machine as claimed in claim 2, wherein each transmitting apparatus comprises an input axis securely connected to a center of the cutter, and the input axis is driven by the control apparatus so as to rotate the cutter.

5. The crab shelling machine as claimed in claim 1, wherein the cutting mechanism comprises a rod connected to at least one of the transport wheels in order to adjust a width of slot.

6. The crab shelling machine as claimed in claim 1, wherein each transmitting apparatus comprises a plurality of idler wheels between the two transport wheels, the idler wheels are located inside and engage with the transport belt in order to tension the transport belt.

7. The crab shelling machine as claimed in claim 6, wherein the idler wheels are smaller than the transport wheels.

8. The crab shelling machine as claimed in claim 7, wherein the idler wheels of each transmitting apparatus are of different diameters.

9. The crab shelling machine as claimed in claim 1, wherein the frame body comprises a water-storage box under the transmitting apparatuses and a drain hole formed on the water-storage box.

10. The crab shelling machine as claimed in claim 1, wherein the cutting mechanism comprises a box shielding the transmitting apparatuses, the slot and the cutter, and a delivery tube fixed to the box for spraying cleaning fluid to clean the cutter.

11. The crab shelling machine as claimed in claim 1, wherein the storage box comprises a discharge opening and a door for opening or closing the discharge opening.

12. The crab shelling machine as claimed in claim 1, wherein the first transfer mechanism comprises a first working table at opposite sides of the first belt for selecting the crabs.

13. The crab shelling machine as claimed in claim 1, wherein the second transfer mechanism comprises a second working table at opposite sides of the second belt for placing the crabs which have been sectioned.

14. The crab shelling machine as claimed in claim 1, wherein the separating mechanism comprises a temperature alarm apparatus set on the storage box.

15. The crab shelling machine as claimed in claim 1, wherein the first transfer mechanism comprises a first motor for driving the first belt, and the second transfer mechanism comprises a second motor for driving the second belt.

16. The crab shelling machine as claimed in claim 1, wherein the cutting mechanism comprises a horizontal protrusion connected to the first belt to function as a feed port, and a downwardly inclined protrusion connected to the second belt to function as a discharge port.

17. The crab shelling machine as claimed in claim 16, wherein either the feed port or the discharge port is wider than the slot.

18. The crab shelling machine as claimed in claim 1, wherein the suction tube extends along a vertical direction perpendicular to the conveying direction.

19. The crab shelling machine as claimed in claim 1, wherein the crab shelling machine comprises a plurality of the separating mechanisms which are arranged along the conveying direction.

20. The crab shelling machine as claimed in claim 1, wherein the crab meat and the crab roe are separated from the crab shells either separately or simultaneously.

* * * * *